(12) United States Patent
Kumaran et al.

(10) Patent No.: US 10,880,186 B2
(45) Date of Patent: Dec. 29, 2020

(54) ROOT CAUSE ANALYSIS OF SEASONAL SERVICE LEVEL AGREEMENT (SLA) VIOLATIONS IN SD-WAN TUNNELS

(71) Applicant: Cisco Technology, Inc., San Jose, CA (US)

(72) Inventors: Vikram Kumaran, Cary, NC (US); Jean-Philippe Vasseur, Saint Martin d'uriage (FR); Grégory Mermoud, Veyras (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/371,556

(22) Filed: Apr. 1, 2019

(65) Prior Publication Data
US 2020/0313979 A1  Oct. 1, 2020

(51) Int. Cl.
| | |
|---|---|
| *H04L 12/24* | (2006.01) |
| *G06N 20/00* | (2019.01) |
| *H04L 12/707* | (2013.01) |
| *H04L 12/26* | (2006.01) |
| *H04L 12/46* | (2006.01) |
| H04L 12/28 | (2006.01) |

(52) U.S. Cl.
CPC ......... *H04L 41/5019* (2013.01); *G06N 20/00* (2019.01); *H04L 12/4633* (2013.01); *H04L 43/028* (2013.01); *H04L 45/22* (2013.01); H04L 12/2854 (2013.01)

(58) Field of Classification Search
CPC . G06N 20/00; H04L 12/2854; H04L 12/4633; H04L 41/5019; H04L 43/028; H04L 45/22
See application file for complete search history.

(56) References Cited

U.S. PATENT DOCUMENTS 7,730,172 B1    6/2010 Lewis
9,450,700 B1 *  9/2016 Van Tonder .......... H04L 41/046
(Continued)

OTHER PUBLICATIONS

"What is Software-Defined WAN (or SD-WAN or SDWAN)?", online: https://www.sdxcentral.com/networking/sd-wan/definitions/software-defined-sdn-wan/, Nov. 2018, printed Mar. 6, 2019, 3 pages, SDX Central.

*Primary Examiner* — Gil H. Lee
(74) *Attorney, Agent, or Firm* — Behmke Innovation Group LLC; Kenneth J. Heywood; James J. Wong

(57) ABSTRACT

In one embodiment, a supervisory service for a software-defined wide area network (SD-WAN) detects seasonal service level agreement (SLA) violations by one or more tunnels in the SD-WAN using a machine learning-based regression model. The service identifies a root cause of the seasonal SLA violations by determining whether the root cause of the seasonal SLA violations is associated with an internal network connected to the one or more tunnels. The service further identifies the root cause by determining whether the root cause of the seasonal SLA violations is associated with a particular service provider network over which the one or more tunnels traverse by associating the seasonal SLA violations with SLA violations by tunnels in other SD-WANs that also traverse the particular service provider network. The service initiates a corrective measure based on the determined root cause of the seasonal SLA violations by the one or more tunnels.

20 Claims, 13 Drawing Sheets

(56) References Cited

U.S. PATENT DOCUMENTS

| | | |
|---|---|---|
| 9,692,662 B2 | 6/2017 | Chan et al. |
| 9,794,145 B2 | 10/2017 | Vasseur et al. |
| 2002/0038366 A1* | 3/2002 | Harasawa ........... H04L 41/5003 |
| | | 709/224 |
| 2007/0083513 A1* | 4/2007 | Cohen .................. G06F 11/008 |
| 2010/0138688 A1 | 6/2010 | Sykes et al. |
| 2013/0227103 A1* | 8/2013 | Garimella ........... H04L 41/5054 |
| | | 709/223 |
| 2014/0358626 A1 | 12/2014 | Bardhan et al. |
| 2015/0124616 A1* | 5/2015 | Lohman ................ H04W 28/08 |
| | | 370/235 |
| 2017/0063783 A1* | 3/2017 | Yong .................. H04L 67/2814 |
| 2017/0195161 A1* | 7/2017 | Ruel ................... H04L 12/4633 |
| 2017/0279698 A1 | 9/2017 | Sartran et al. |
| 2019/0334813 A1* | 10/2019 | Raj ......................... H04L 45/64 |
| 2019/0361759 A1* | 11/2019 | Haugen ............... G06F 11/0751 |

* cited by examiner

ROOT CAUSE ANALYSIS OF SEASONAL SERVICE LEVEL AGREEMENT (SLA) VIOLATIONS IN SD-WAN TUNNELS

TECHNICAL FIELD

The present disclosure relates generally to computer networks, and, more particularly, root cause analysis of seasonal service level agreement (SLA) violations in software-defined wide area network (SD-WAN) tunnels.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Today, the SLA behavior of an individual tunnel is measured using Bidirectional Forwarding Detection (BFD) probes, to capture the delay, loss, and jitter experienced by the tunnel over a given period of time. For example, BED probes are typically sent six times over time windows of approximately ten minutes each, to assess the performance of the tunnel. This mean that can normally take around one hour to detect an SLA violation and trigger a corrective measure.

DESCRIPTION OF EXAMPLE EMBODIMENTS

Overview

Figure 1A:
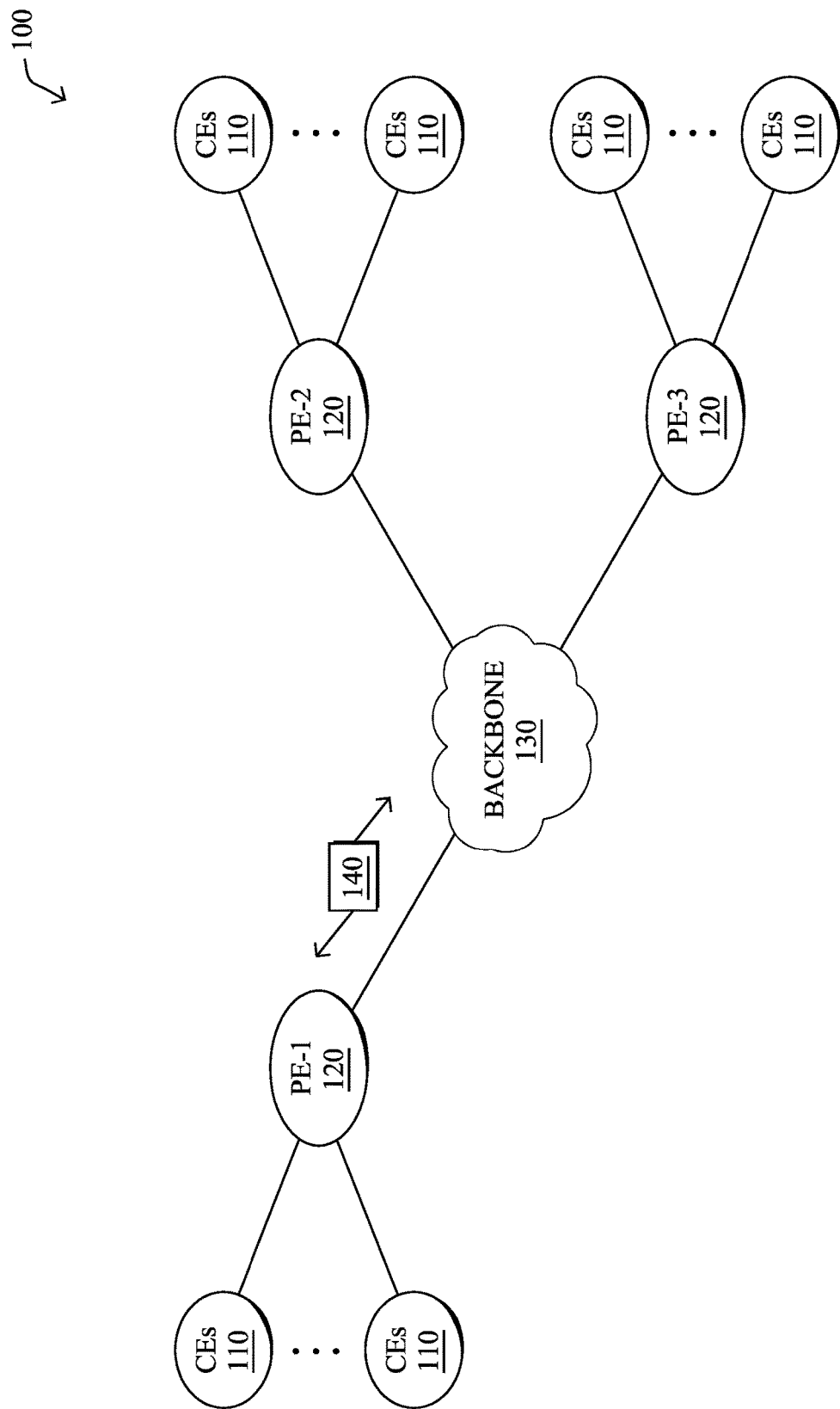
FIGS. 1A-1B illustrate an example communication network.

According to one or more embodiments of the disclosure, a supervisory service for a software-defined wide area network (SD-WAN) detects seasonal service level agreement (SLA) violations by one or more tunnels in the SD-WAN using a machine learning-based regression model. The service identifies a root cause of the seasonal SLA violations by determining whether the root cause of the seasonal SLA violations is associated with an internal network connected to the one or more tunnels. The service further identifies the root cause by determining whether the root cause of the seasonal SLA violations is associated with a particular service provider network over which the one or more tunnels traverse by associating the seasonal SLA violations with SLA violations by tunnels in other SD-WANs that also traverse the particular service provider network. The service initiates a corrective measure based on the determined root cause of the seasonal SLA violations by the one or more tunnels.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
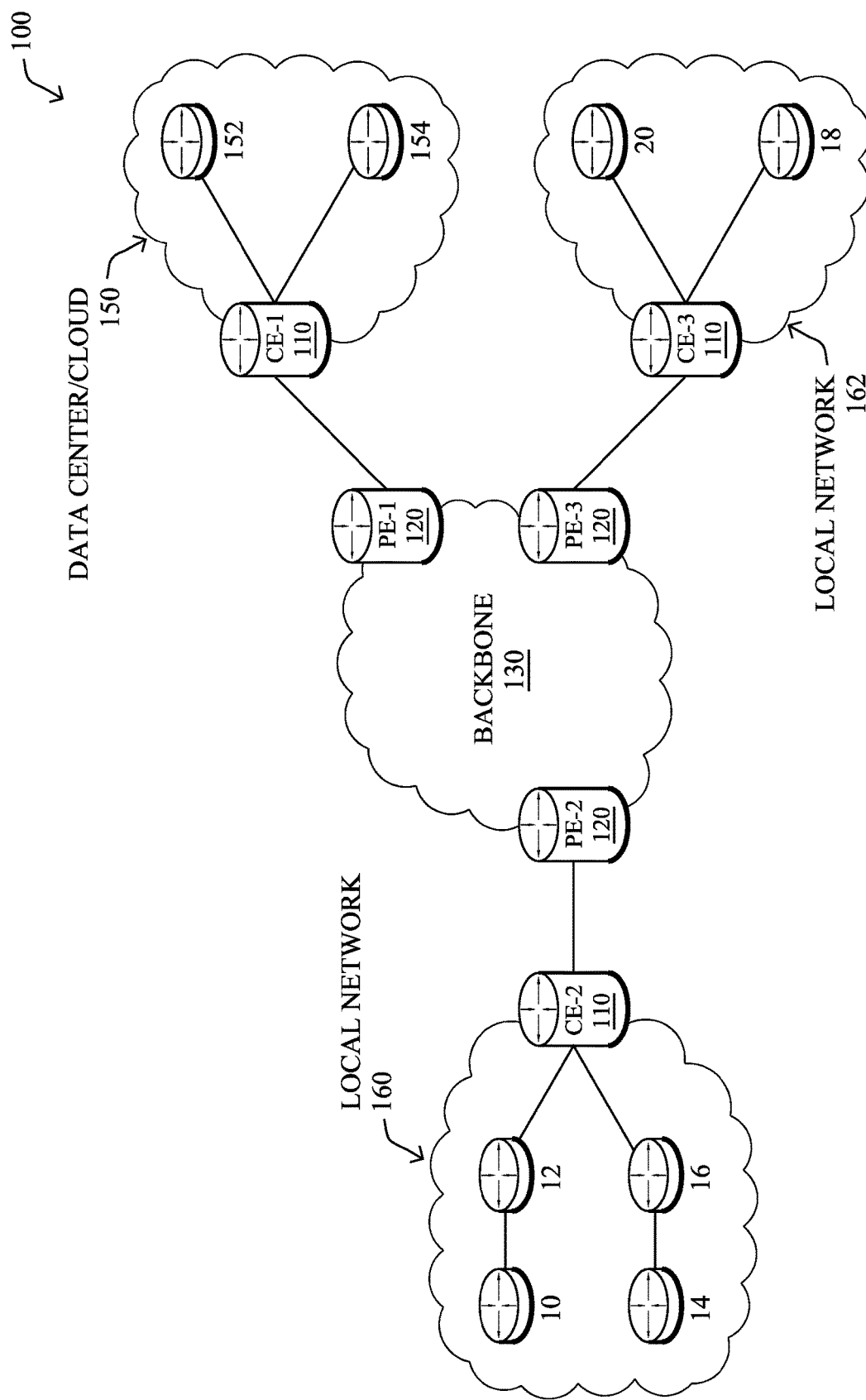

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
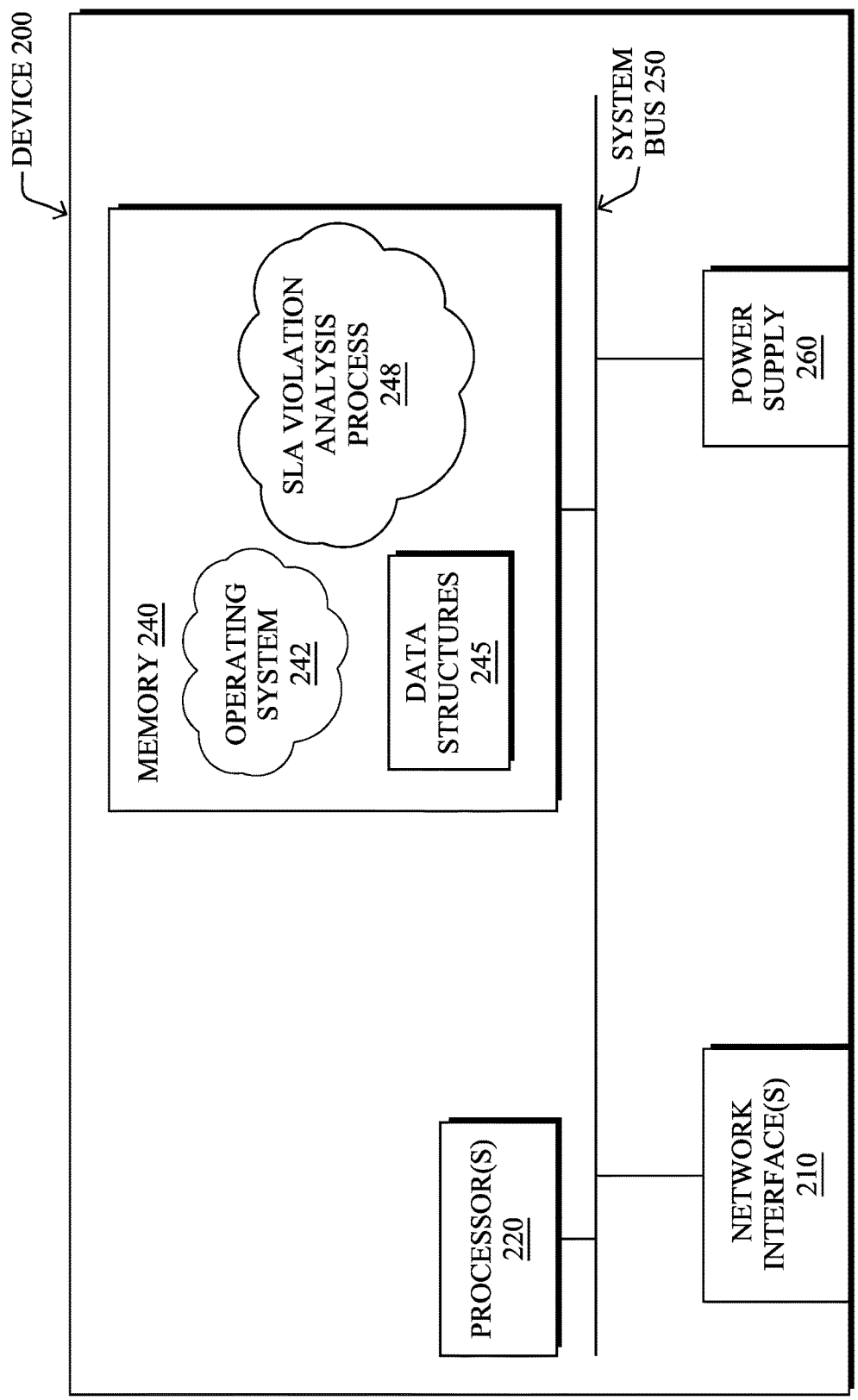
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an SLA violation analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

SLA violation analysis process 248, detailed further below, includes computer executable instructions that, when executed by processor(s) 220, cause device 200 to provide a supervisory service for one or more SD-WANs and, more particularly, to analyze SLA violations by tunnels of the SD-WAN(s). To do so, in some embodiments, SLA violation analysis process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SLA violation analysis process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given SLA and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that SLA violation analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that an SLA will be violated. Conversely, the false negatives of the model may refer to the number of times the model predicted that an SLA will be met when, in fact, the SLA was violated. True negatives and positives may refer to the number of times the model correctly predicted whether an SLA was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, traditional approaches to ensuring that a tunnel satisfies its SLA(s), such as uptime, responsiveness, guaranteed bandwidth, etc., rely on Bidirectional Forwarding Detection (BFD) probes to measure the delay, loss, jitter, etc. along the tunnel. This process is time consuming and, in many cases, can take an hour or more to detect an SLA violation. Once detected, the network controller can reactively take corrective measures, such as moving the traffic to a different tunnel, etc.

A key observation about SLA violations by tunnels in an SD-WAN is that some of these violations are seasonal (e.g., periodic) in nature, for various reasons. For example, the SLA violations may be attributable to a large increase in the traffic sent from the internal network via the tunnel, congestion in the service provider network via which the tunnel traverses, or the like. This observation can be leveraged to both predict when the SLA violations are likely to occur, as well as identify the root cause of the violations, in some cases.

Root Cause Analysis of Seasonal SLA Violations in SD-WAN Tunnels

The techniques herein leverage machine learning to identify seasonal SLA violations by tunnels in an SD-WAN and perform correlation with both internal and external variables, to identify the root cause of the violations. In some aspects, root causes attributable to the internal network (e.g., the network sending traffic via the tunnel) can be identified through analysis of variables such as packet loss, information obtained from deep packet inspection (DPI) of the traffic, and the like. In further aspects, root causes attributable to the service provider network over which the tunnel traverses can also be identified leveraging insights from multiple SD-WANs that use the same provider network. In further aspects, depending on the root cause, the supervisory service can also initiate any number of corrective measures, such as using closed-loop control to proactively reroute traffic, trigger changes in the local/internal network (e.g., rescheduling large traffic patterns that cause the seasonal SLA violations, etc.).

Specifically, according to one or more embodiments herein, a supervisory service for a software-defined wide area network (SD-WAN) detects seasonal service level agreement (SLA) violations by one or more tunnels in the SD-WAN using a machine learning-based regression model. The service identifies a root cause of the seasonal SLA violations by determining whether the root cause of the seasonal SLA violations is associated with an internal network connected to the one or more tunnels. The service further identifies the root cause by determining whether the root cause of the seasonal SLA violations is associated with a particular service provider network over which the one or more tunnels traverse by associating the seasonal SLA violations with SLA violations by tunnels in other SD-WANs that also traverse the particular service provider network. The service initiates a corrective measure based on the determined root cause of the seasonal SLA violations by the one or more tunnels.

Illustratively, the techniques described herein may be performed by hardware, software, and/or firmware, such as in accordance with the SLA violation analysis process 248, which may include computer executable instructions executed by the processor 220 (or independent processor of interfaces 210) to perform functions relating to the techniques described herein.

Figure 3:
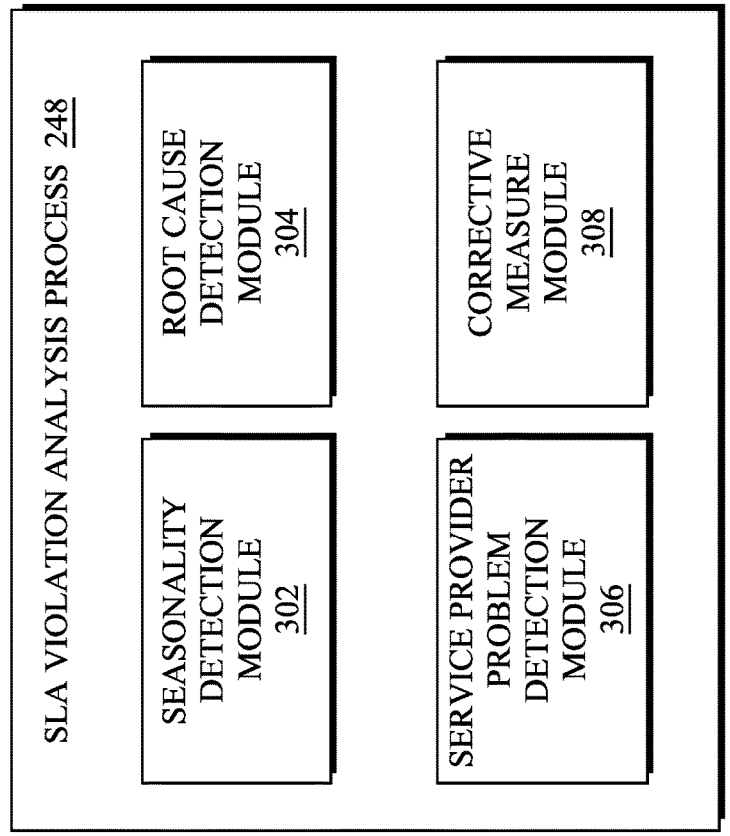
FIG. 3 illustrates an example architecture for analyzing service level agreement (SLA) violations.

Operationally, FIG. 3 illustrates an example architecture 300 for analyzing SLA violations, according to various embodiments. In general, architecture 300 may be implemented by a device (e.g., device 200 described previously) executing specialized instructions, such as SLA violation analysis process 248, to provide a supervisory service to one or more SD-WAN instances. For example, an SD-WAN controller or other monitoring service may implement architecture 300 either locally in the network or as a cloud-based service. As shown, SLA violation analysis process 248 may include the following components: a seasonality detection module 302, a root cause detection module 304, a service provider problem detection module 306, and a corrective measure module 308. These components 302-308 may be implemented in a distributed manner or implemented as their own stand-alone services, either as part of the network under observation or as a remote service. In addition, the functionalities of the components of architecture 300 may be combined, omitted, or implemented as part of other processes, as desired.

In general, and as detailed further below, architecture 300 may implement any or all of the following functionalities:
 Detecting Seasonal Tunnels: using machine learning, architecture 300 can identify tunnels that exhibit seasonal SLA violations.
 identify Internal Causes of SLA Violations: architecture 300 can also identify features of the internal network that are strongly correlated with the seasonal SLA violations and suggest them as possible root causes.
 Identify Internal Causes of SLA Violations: architecture 300 can also identify problems in the service provider network as the root cause of the SLA violations, by correlating the seasonal SLA violations with those experienced by other tunnels in other SD-WANs that use the same service provider network.
 Find Alternate Tunnels and Other Corrective Measures: architecture 300 can also identify and initiate corrective measures, once the root cause of the seasonal SLA violations is determined. For example, architecture 300 may look for other tunnels between the same endpoints that do not exhibit the same seasonal violations before the next SLA violation is expected, thereby improving the quality of service of the SD-WAN.

In various embodiments, architecture 300 may include seasonality detection module 302 configured to detect seasonal SLA violations by an SD-WAN tunnel. In some embodiments, seasonality detection module 302 may include a machine learning-based regression model that takes as input time series of SLA violations by the tunnels under scrutiny. The steps performed by seasonality detection module 302 may include any or all of the following:
 Take as input a time series of SLA failures with a sliding time window for analysis (e.g., $ weeks).
 Run a regression model on the time series using the following features:
  Time of day (e.g., 1 PM, 2 PM, etc.)
  All possible time blocks for a day (e.g., 1-3 PM, 4-8 PM, etc.)
  Day of week
 Constrain the regression model to provide a sparse explanation (minimizing features used in the model) using machine learning regularization techniques such as L1 and L2 regularization, dropout, or the like.
 If the regression model has sufficiently high precision and recall, the SLA violations by the tunnel can be deemed seasonal.
 The regression weights of the selected features (e.g., time of day ranges, day of week) are aggregated to find the times of day where there is high confidence of SLA failure.

If seasonality detection module 302 determines that a particular SD-WAN tunnel is experiencing seasonal SLA violations, seasonality detection module 302 may provide an indication of the tunnel and violations to a user interface for review by a network operator. Seasonality detection module 302 may also notify root cause detection module 304 and/or service provider problem detection module 306 as to the seasonal violations.

Figure 4A:
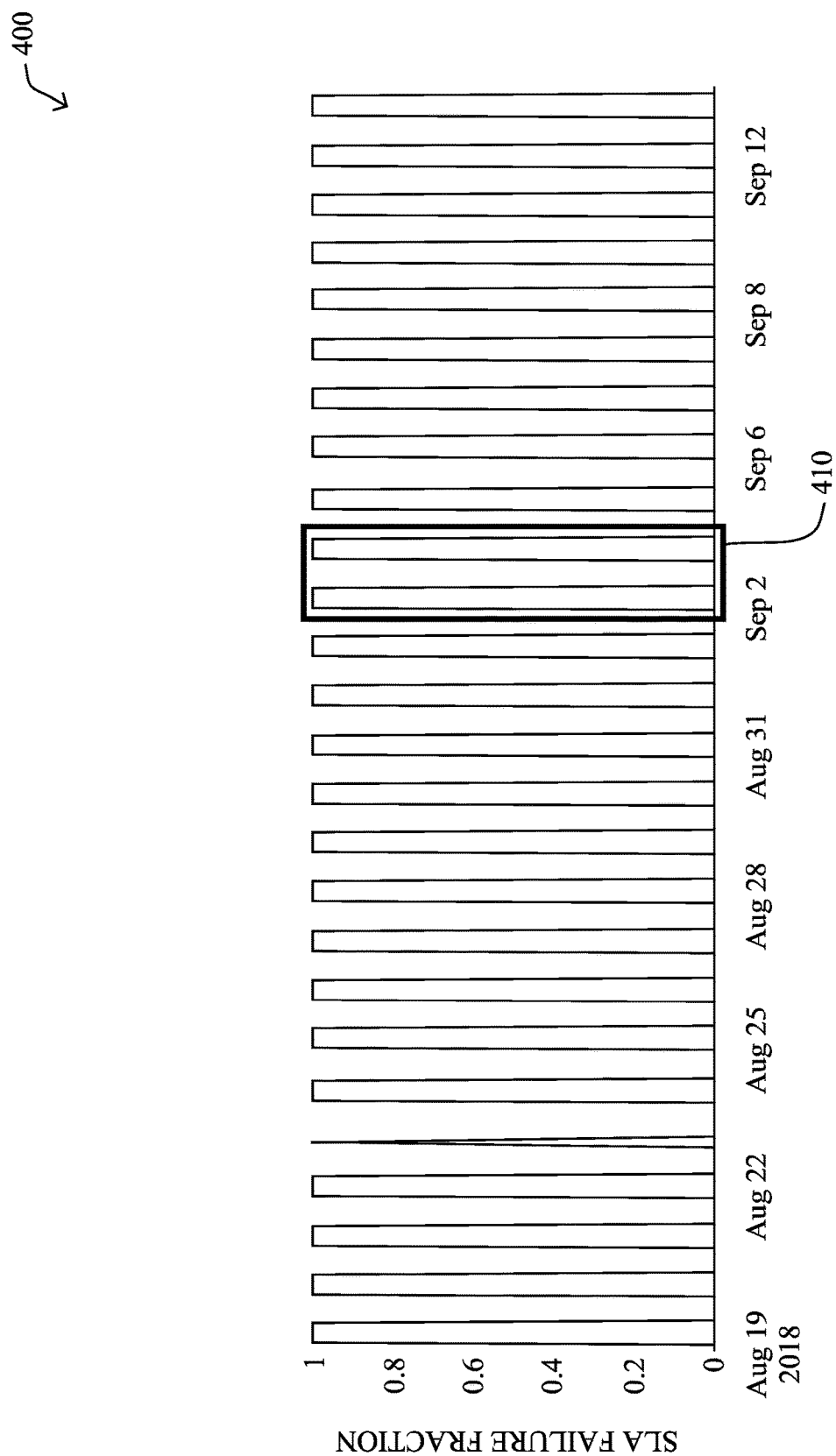
FIGS. 4A-4B illustrate an example plot of seasonal SLA violations by a tunnel.
Figure 4B:
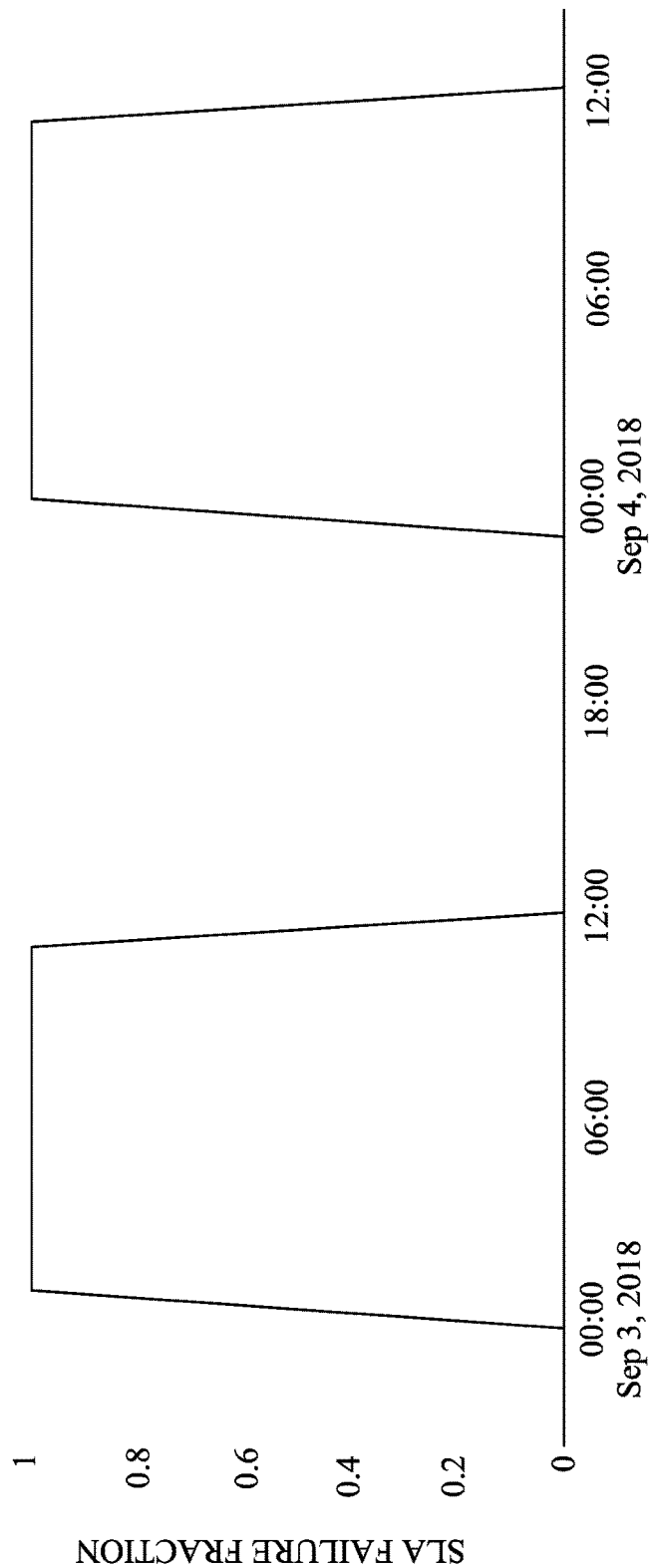

FIGS. 4A-4B illustrate an example plot 400 of seasonal SLA violations by a tunnel. As shown in FIG. 4A, plot 400 plots the fraction of SLA failures over several weeks. Zooming in on time window 410, shown in greater detail in FIG. 4B, it can be seen that the SLA violations occur during specific times of day, such as between 1:00 AM and 11:00 AM.

Referring again to FIG. 3, the regression model of seasonality detection module 302 may select the following features based on the time series shown in FIGS. 4A-4B:
 'tod_dow_features': '{"featureList": [["tod_11", 3.3467217310483535],
  ["tod_9", 3.3467217310483451],
  ["tod_8", 3.3467217310483464],
  ["tod_10", 3.3467217310483464],
  ["tod_6", 3.346721706236197],
  ["tod_7", 3.346679445411721],
  ["tod_4", 3.3466794454117177],
  ["tod_5", 3.2538602423907887],
  ["tod_3", 3.25386021844051]]}'
where tod_n corresponds to the hour of day (e.g., tod_11 corresponds to 11:00 AM, etc.). Based on this time series, the regression model may determine that the tunnel is likely to exhibit SLA violations between 1:00 AM and 11:00 AM daily, with a confidence of 0.97.

Figure 5A:
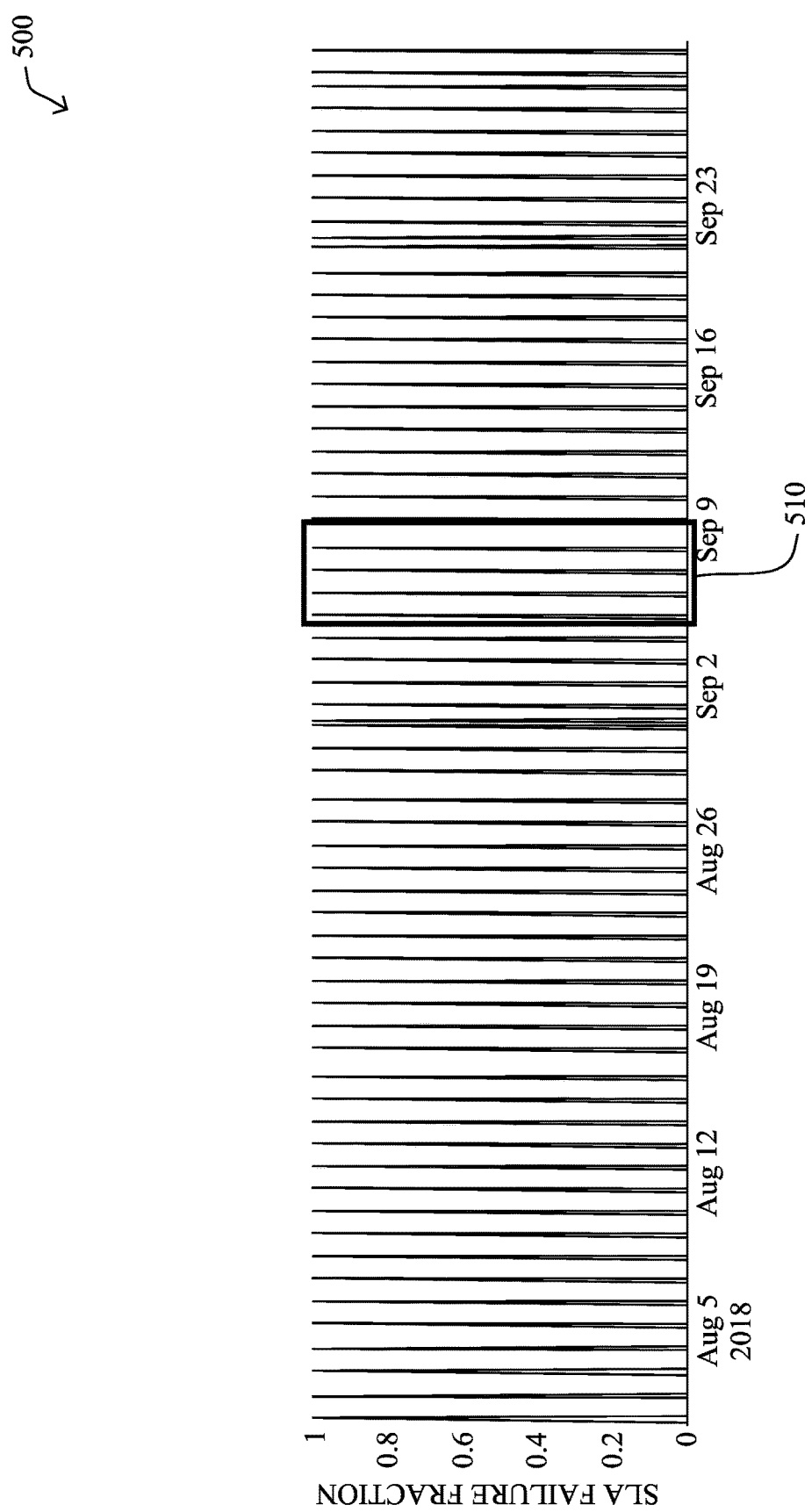
FIGS. 5A-5B illustrate another example plot of seasonal SLA violations by a tunnel.
Figure 5B:
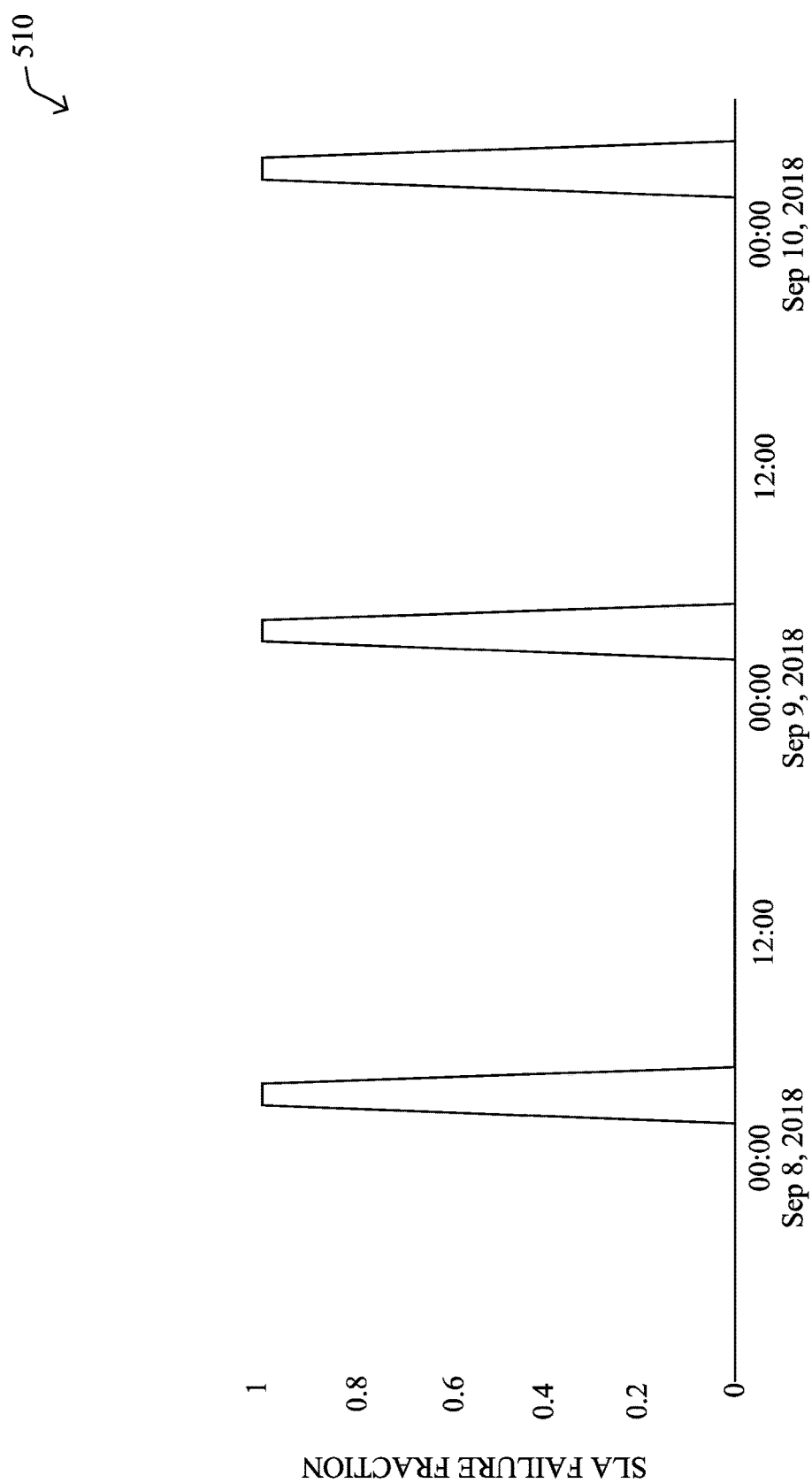

FIGS. 5A-5B illustrate another example plot 500 of seasonal SLA violations by a tunnel. As shown in FIG. 5A, plot 500 plots the fraction of SLA failures over time for another SD-WAN tunnel. Zooming in on time window 510, as shown in FIG. 5B demonstrates a very different seasonal SLA violation pattern than that shown in FIGS. 4A-4B. Here, application of the regression model of seasonality detection module 302 to this time series may indicate that the SLA violations by the tunnel typically occur between 3:00 AM and 5:00 AM with a confidence of 0.93.

Referring again to FIG. 3, once seasonality detection module 302 has identified an SD-WAN tunnel as exhibiting seasonal SLA violations, root cause detection module 304 may assess whether the root cause of the violations is attributable to the internal network, in various embodiments. During execution, root cause detection module 304 may assess whether any metrics or other telemetry captured regarding the internal network (e.g., local network 160 shown in FIG. 1B) are correlated with the SLA violations and, if so, flag them as potential root causes of the violations. The steps for performing this correlation are as follows:

- Take as input a time series of SLA violations with a suitable sliding time window for analysis (e.g., 8 weeks).
- Collect a set of features from the internal network that are possible root causes of the violations.
- For each feature, calculate the time-based correlation between the feature and SLA failure (e.g., using Pearson's Correlation).
- Pick tunnels that have multiple features correlated to SLA failures (e.g., greater than a threshold correlation).
- Select those one or more features as the root cause(s) of the SLA failures.

Figure 6:
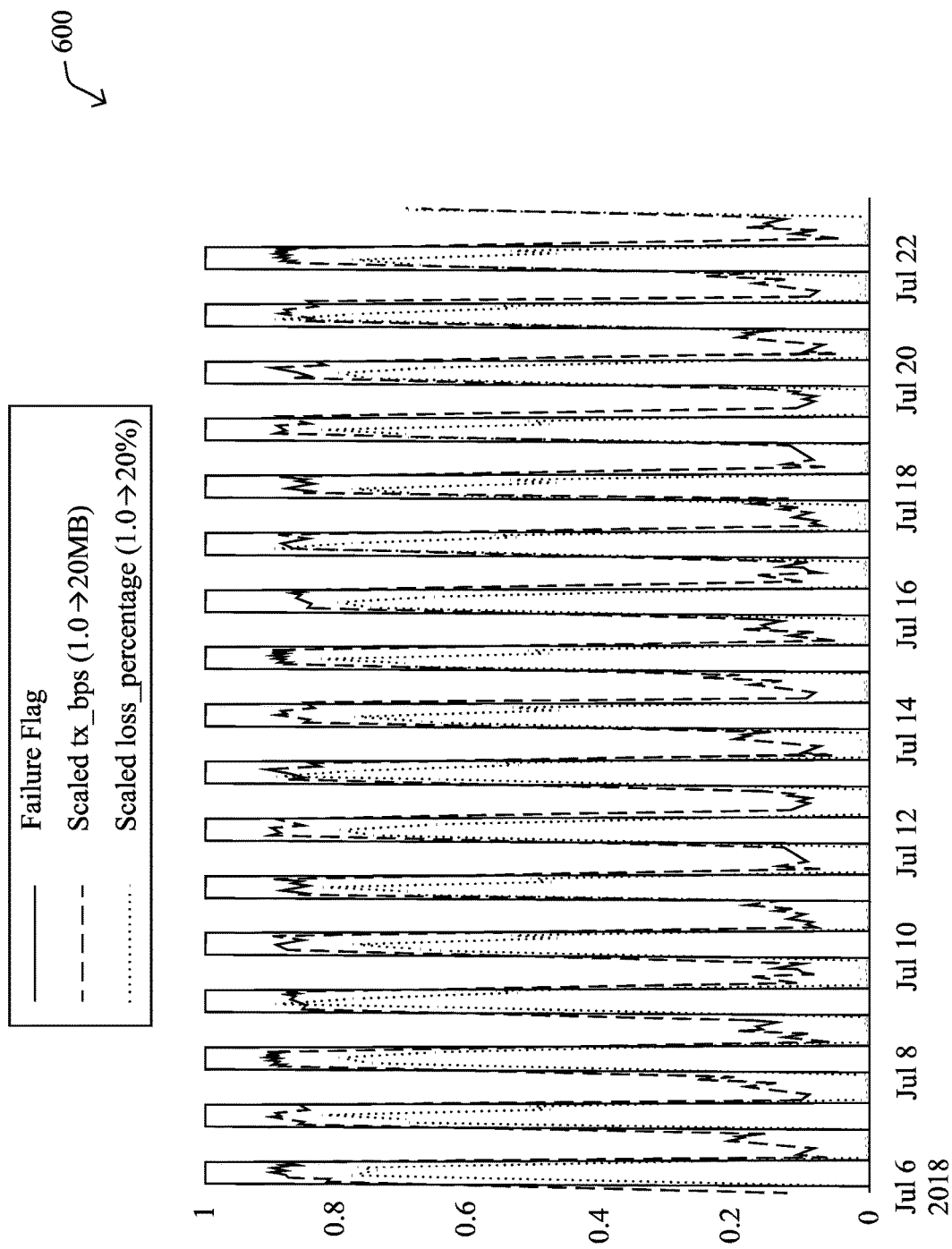
FIG. 6 illustrates an example plot of periodic SLA violations by a tunnel and traffic patterns associated with the tunnel.

By way of example, consider the example plot 600 shown in FIG. 6 of periodic SLA violations by a tunnel and traffic patterns associated with the tunnel. In such a case, seasonality detection module 302 may determine that there are seasonal SLA violations that occur between 1:00 AM and 12:00 PM UTC. Highly correlated with these failures are sharp increases in the traffic volume transmitted via the tunnel(s), scaling from approximately 1 to 20 MB during these times. In addition, the loss percentage is also highly correlated to the SLA violations, increasing from approximately 1% to 20% during these times.

Referring again to FIG. 3, in some embodiments, root cause detection module 304 may also rely on DPI information captured regarding the traffic sent over the SD-WAN tunnels, to assess whether the root cause is in the internal network. In the above case, root cause detection module 304 may assess the various traffic features that can be captured through normal telemetry gathering mechanisms (e.g., packet loss, traffic volume, etc.). In this embodiment, DPI can also be performed on the fly to capture additional information about the traffic during the times of SLA violations, such as the set of top applications being used during those periods, potential spikes of traffic, etc. Indeed, it is not rare to find out that seasonal traffic is highly correlated with seasonal SLA violations. For example, a large backup from the internal network (e.g., from local network 160 to data center/cloud 150 in FIG. 1B) by a specific application may explain why the SLA violations are occurring during these times.

In another embodiment, root cause detection module 304 may leverage machine learning, to identify root-causes of seasonal SLA violations. For example, root cause detection module 304 may operate as follows:

- For each tunnel facing seasonal SLA violations during time-period [t1, t2], identify other time-periods in the past where such failures were not experienced.
- Add an additional column ("label") which is "0" for periods where there are seasonal failures (all points in [t1,t2] time) and "1" during other periods.
- Train a machine learning-based classifier to determine the "label." If the model has good accuracy, then list the top-k most important features based on feature importance score of the classification model.
- Identify these features as the possible root-cause features.
- Additional tools, such as LIME, can also be used to infer more accurate patterns of root-cause features.

In various embodiments, architecture 300 may also include service provider problem detection module 306, which is configured to analyze whether the seasonal SLA violations are attributable to the service provider network over which the affected SD-WAN tunnel(s) traverse. Service provider problem detection module 306 may search for matching patterns with respect to the service provider network and location that matches the SLA violation pattern of the tunnel(s). For example, service provider problem detection module 306 may perform the following steps:

- Detect tunnels that exhibit seasonal SLA violations across any number of different SD-WANs for any number of different entities (e.g., for different businesses, schools, etc.).
- Group the seasonal tunnels by location, tunnel_color (e.g., MPLS, Internet, etc.) and service provider.
- Look across all the tunnels to see whether any location, tunnel_color pair has multiple seasonal tunnels across entities, for the same time period.
- Look at the tunnel seasonality to validate that the time series of SLA failures are highly correlated.

Figure 7A:
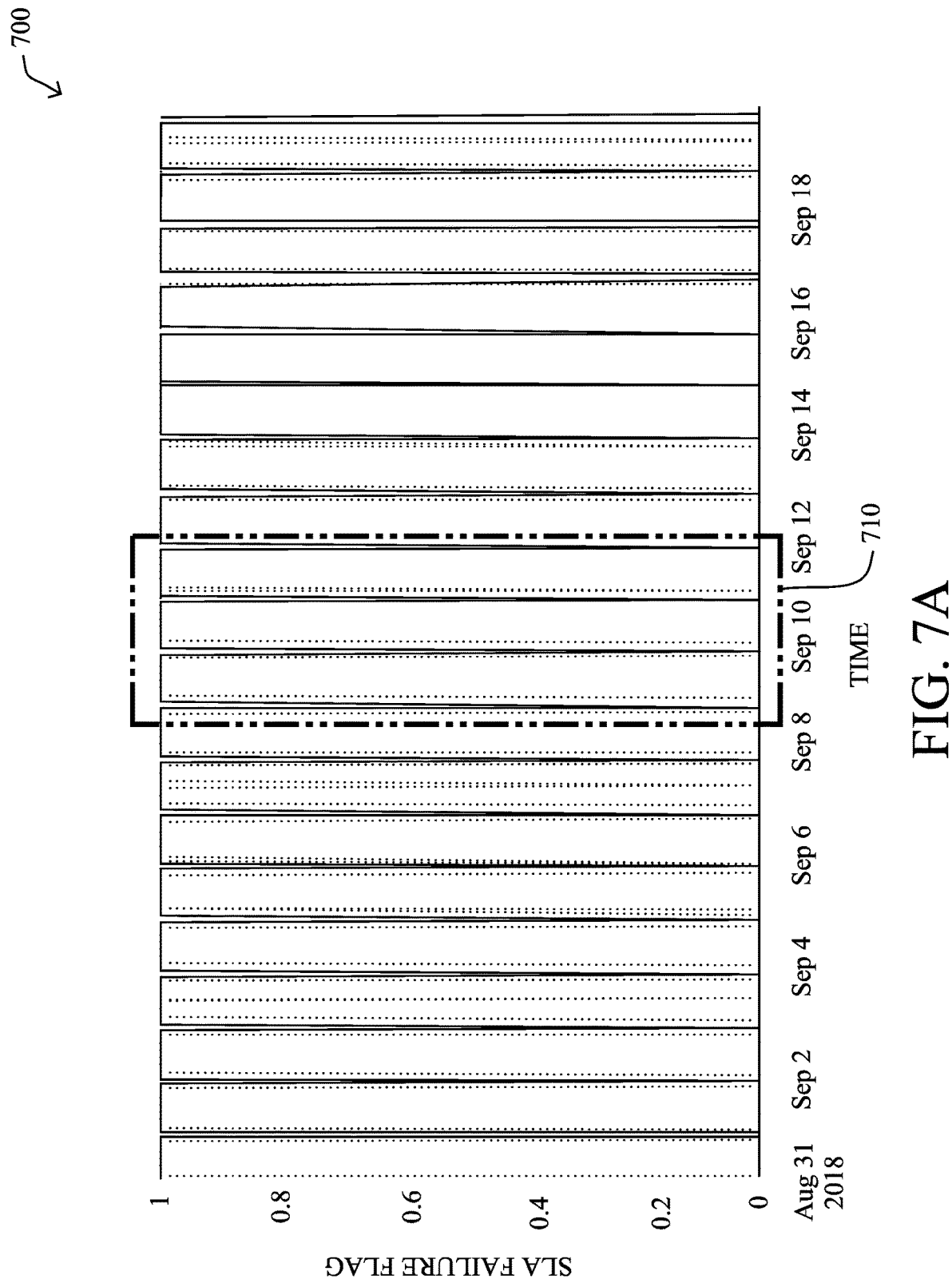
FIGS. 7A-7B illustrate an example plot of SLA violations associated with a service provider network.
Figure 7B:
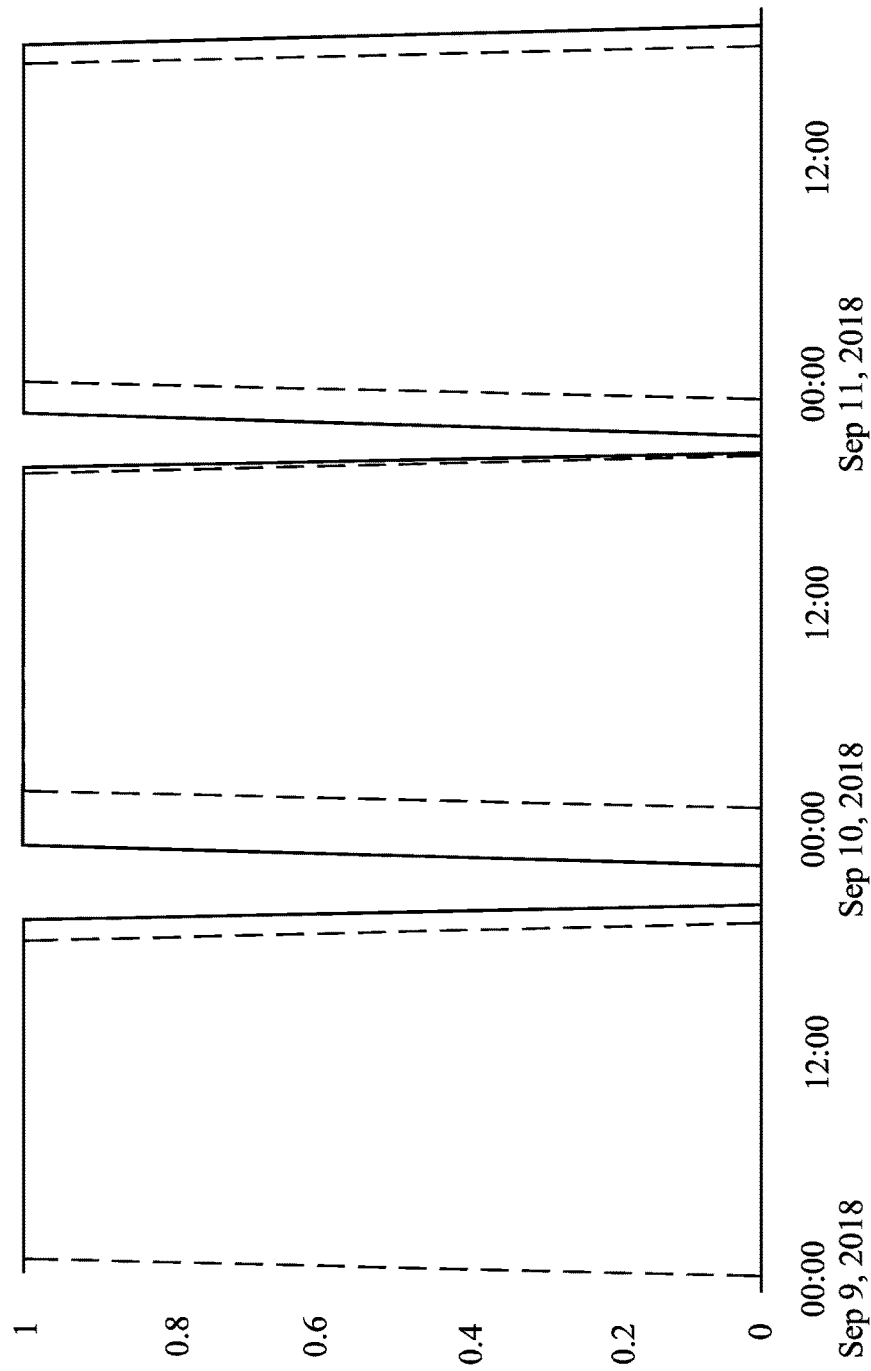

FIGS. 7A-7B illustrate an example plot 700 of SLA violations associated with a service provider network. More specifically, plot 700 in FIG. 7A shows SLA failures over time for two different entities/SD-WANs that use the same service provider network. Zooming in on time window 710, shown in greater detail in FIG. 7B, it can be seen that the SLA violations experienced by the tunnels in the different SD-WAN are highly correlated and often occur at the same time. In such cases, service provider problem detection module 306 may determine that the common provider network used by both sets of tunnels is likely to be the root cause of the SLA violations.

Referring again to FIG. 3, architecture 300 may also include corrective measure module 308 configured to identify a corrective measure, when either of modules 304-306 identify a root cause of the seasonal SLA violations identified by module 302, according to various embodiments. In the simplest case, the corrective measure may entail routing the affected traffic to another tunnel that is not affected by the seasonal SLA violations. In turn, corrective measure module 308 may implement the changeover before the next SLA violation is expected to occur.

During execution, corrective measure module 308 may take any or all of the following steps:

- Receive as input the tunnels identified by seasonality detection module 302 as experiencing seasonal SLA violations.
- Collect the SLA behavior time series data for all tunnels between the same two endpoints.
- Compare the SLA behavior of the seasonal tunnel with the each of the alternate tunnels, finding the tunnel that has the most negatively correlated, SLA behavior.
- Switch critical traffic from the problem tunnel with periodic SLA violations to the tunnel that is meeting the SLA. Preferably, this switch is performed before the SLA drops on the offending tunnel.

Another potential corrective measure that corrective measure module 308 may take is alerting the network operator to the seasonal SLA violations and their root cause, as determined by modules 304-306, by sending information regarding the violations and their root cause to a user interface. For example, in the case of high traffic volume due to a backup causing the SLA violations, the operator may decide to reschedule to backup to a different time.

Figure 8:
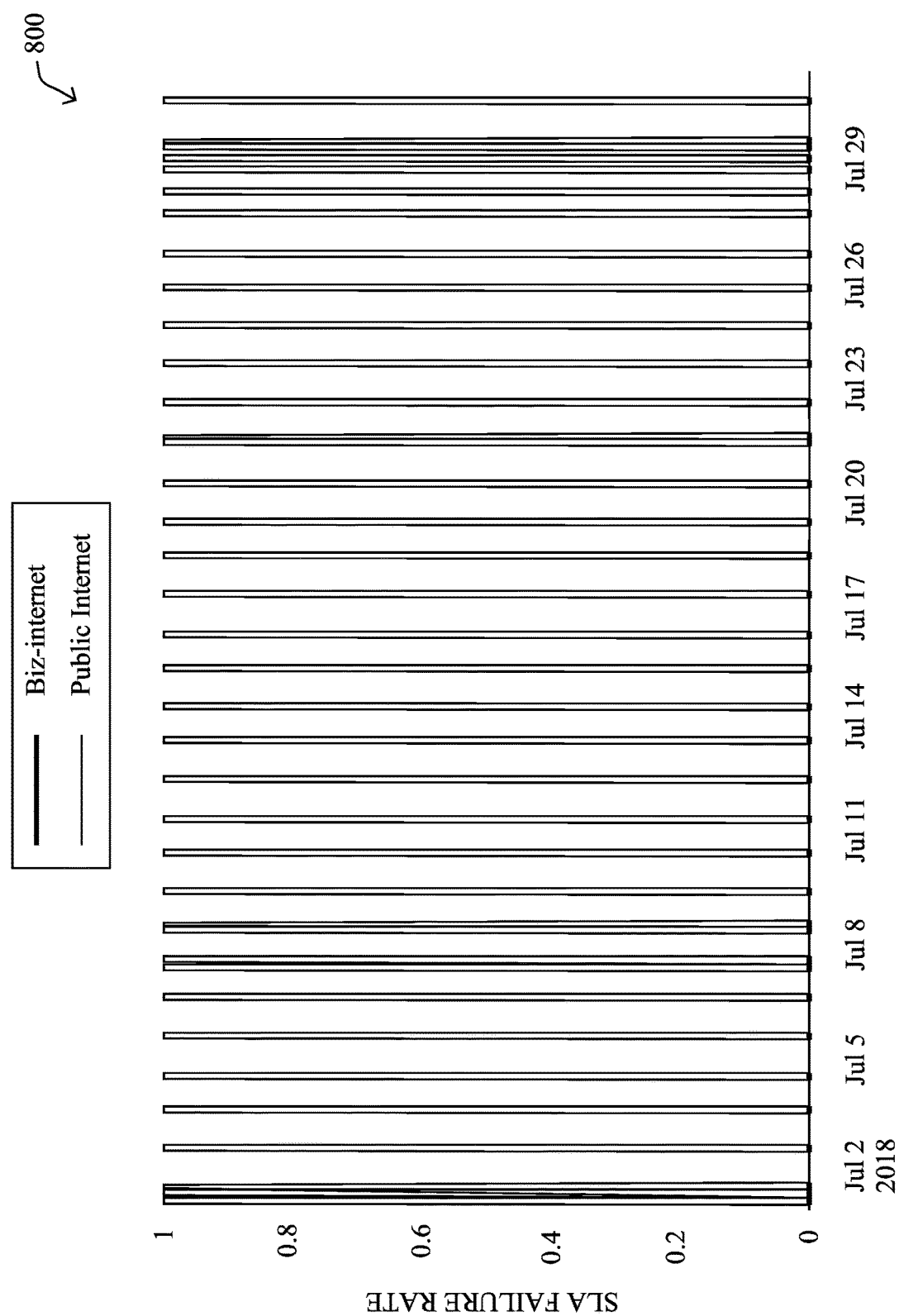
FIG. 8 illustrates an example plot of SLA failure rates for different tunnels.

For example, as shown in FIG. 8, plot 800 shows the SLA failure rates for two different tunnels between the same endpoints: one tunnel that uses a business (biz) Internet connection and another that uses a public Internet connection. As can be seen, the public Internet connection clearly demonstrates a seasonal SLA violation pattern, whereas the other connection does not. In such a case, corrective measure module 308 may opt to proactively switch the traffic from the tunnel over the public Internet connection to the other tunnel over the business Internet connection.

Referring again to FIG. 3, in all cases, corrective measure module 308 may report the seasonal SLA violations to the network management system, along with the identified root cause. When the root cause is "internal" the operator may take some actions (e.g., modify schedules of large flows sent onto the tunnel such as large backup traffic, change priority assigned to those large flows so as to not disrupt over traffic). In one embodiment, corrective measure module 308 may provide the top applications that have high traffic during seasonal periods to a user interface for review. For example, if backups of storages are scheduled across multiple entities at the same time, it is highly likely that these applications are causing traffic surges that leads to the SLA violations. In such a case, corrective measure module 308 may perform the following steps:

Identify the category of each root-cause applications.

If the application is considered to be flexible, such as applications like bulk-backups, which can be rescheduled, then generate an indication of this for presentation and rescheduling of the backups.

If the root cause of the SLA violations is external (sites is connected to a service provider experiencing seasonal SLA violation), corrective measure module 308 may send an indication of this to a user interface, potentially with suggested other provider networks or other transports (e.g., rerouting the traffic onto a tunnel not experiencing such issues, etc.).

Figure 9:
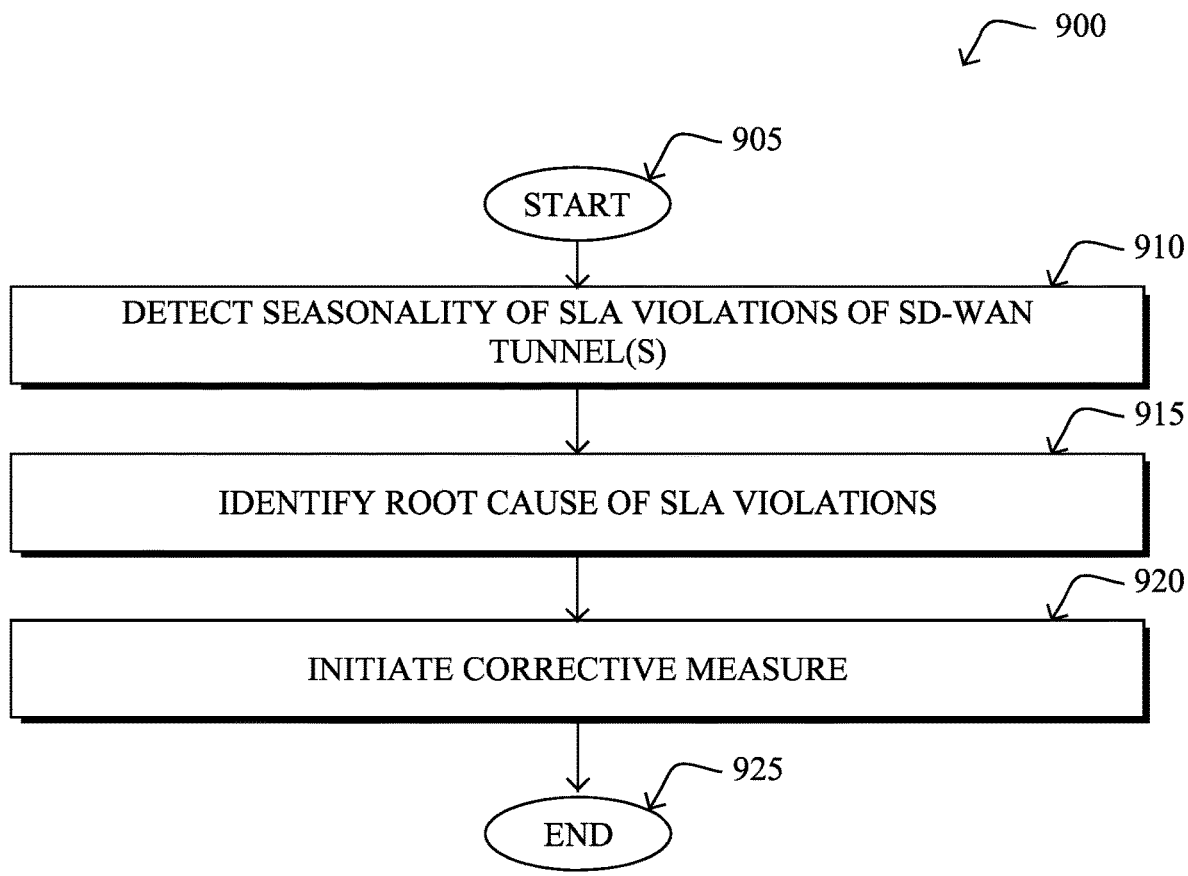
FIG. 9 illustrates an example simplified procedure for performing root cause analysis of SLA violations by one or more tunnels.

FIG. 9 illustrates an example simplified procedure for performing root cause analysis of SLA violations by one or more tunnels, in accordance with one or more embodiments described herein. For example, a non-generic, specifically configured device (e.g., device 200) may perform procedure 900 by executing stored instructions (e.g., process 248), to provide a supervisory service to one or more SD-WANs. The procedure 900 may start at step 905, and continues to step 910, where, as described in greater detail above, the supervisory service may detect seasonal SLA violations by one or more tunnels in the SD-WAN using a machine learning-based regression model. Such a model may, for example, take as input a time series of SLA violations for the tunnel(s) and use features such as time-of-day and day-of-week, to identify when the seasonal SLA violations occur (e.g., on Mondays between 10:00-11:00 AM, etc.).

At step 915, as detailed above, the supervisory service may identify a root cause of the seasonal SLA violations. In some embodiments, the service may do so in part by determining whether the root cause of the seasonal SLA violations is associated with an internal network connected to the one or more tunnels. For example, the service may attempt to see whether seasonal spikes in traffic in the internal network, packet drops, or other measurements in the internal network are correlated with the SLA violations. In another embodiment, the service may use a machine learning-based classifier to identify one or more traffic features of traffic in the internal network as associated with the SLA violations. In yet another embodiment, the service may perform deep packet inspection on traffic of the internal network sent via the one or more tunnels, to identify one or more applications associated with the traffic.

In further embodiments, the service may also identify the root cause of the seasonal SLA violations in part by determining whether the root cause of the seasonal SLA violations is associated with a particular service provider network over which the one or more tunnels traverse by associating the seasonal SLA violations with SLA violations by tunnels in other SD-WANs that also traverse the particular service provider network. For example, the service may identify the tunnels in the other SD-WANs that also traverse the particular service provider network and determine a measure of correlation between SLA failure time series for the other tunnels with one or more SLA failure time series for the one or more tunnels in the SD-WAN.

At step 920, the supervisory service may initiate a corrective measure based on the determined root cause of the seasonal SLA violations by the one or more tunnels, as described in greater detail above. In some embodiments, the service may redirect the traffic of the one or more tunnels to one or more alternate tunnels in the SD-WAN. For example, if the root cause of the SLA violations was the service provider network, the service may move the traffic to one or more other tunnels that use a different service provider network. In further embodiments, the service may provide information regarding the SLA violations and their root cause to a user interface for review. Procedure 900 then ends at step 925.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an approach for addressing seasonal SLA violations by SD-WAN tunnels. In addition to identifying the seasonal SLA violations, the techniques herein also provide a comprehensive root causing approach that is able to identify both internal and external causes of the SLA violations.

While there have been shown and described illustrative embodiments that provide for root cause analysis of SLA violations of SD-WAN tunnels, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  detecting, by a supervisory service for a plurality of software-defined wide area networks (SD-WANs), seasonal service level agreement (SLA) violations by one or more tunnels in a SD-WAN of the plurality of SD-WANs using a machine learning-based regression model, wherein the SD-WAN allows virtualization of WAN functions over the one or more tunnels for one or more service provider networks;
  identifying, by the supervisory service, a root cause of the seasonal SLA violations as associated either 1) with an internal network connected to the one or more tunnels or 2) with a particular service provider network over which the one or more tunnels traverse by:
    determining whether the root cause of the seasonal SLA violations is associated with the internal network by analyzing traffic in the internal network, and
    determining whether the root cause of the seasonal SLA violations is associated with the particular service provider network by determining a measure of correlation between SLA failure time series for tunnels in other SD-WANs of the plurality of SD-WANs that also traverse the particular service provider network with one or more SLA failure time series for the one or more tunnels in the SD-WAN; and
  initiating, by the supervisory service, a corrective measure based on the determined root cause of the seasonal SLA violations by the one or more tunnels.

2. The method as in claim 1, wherein determining whether the root cause of the seasonal SLA violations is associated with a particular service provider network comprises:
  identifying the tunnels in the other SD-WANs that also traverse the particular service provider network.

3. The method as in claim 1, wherein determining whether the root cause of the seasonal SLA violations is associated with the internal network connected to the one or more tunnels comprises:
  identifying seasonal spikes in the traffic in the internal network associated with the one or more tunnels.

4. The method as in claim 1, wherein determining whether the root cause of the seasonal SLA violations is associated with the internal network connected to the one or more tunnels comprises:
  using a machine learning-based classifier to identify one or more traffic features of traffic in the internal network as associated with the SLA violations.

5. The method as in claim 1, wherein initiating the corrective measure based on the determined root cause comprises:
  redirecting traffic of the one or more tunnels to one or more alternate tunnels in the SD-WAN.

6. The method as in claim 5, wherein the root cause of the seasonal SLA violations is identified as the particular service provider network, and wherein the one or more alternate tunnels traverse a different service provider network.

7. The method as in claim 1, wherein determining whether the root cause of the seasonal SLA violations is associated with the internal network connected to the one or more tunnels comprises:
  performing deep packet inspection on traffic of the internal network sent via the one or more tunnels, to identify one or more applications associated with the traffic.

8. The method as in claim 1, further comprising:
  providing, by the supervisory service, an indication of the seasonal SLA violations and the root cause to a user interface.

9. The method as in claim 1, wherein the regression model uses time-of-day and day-of-week as features.

10. An apparatus, comprising:
  one or more network interfaces to communicate with a plurality of software-defined wide area networks (SD-WANs);
  a processor coupled to the network interfaces and configured to execute one or more processes; and
  a memory configured to store a process executable by the processor, the process when executed configured to:
    detect seasonal service level agreement (SLA) violations by one or more tunnels in a SD-WAN of the plurality of SD-WANs using a machine learning-based regression model, wherein the SD-WAN allows virtualization of WAN functions over the one or more tunnels for one or more service provider networks;
    identify a root cause of the seasonal SLA violations as associated either 1) with an internal network connected to the one or more tunnels or 2) with a particular service provider network over which the one or more tunnels traverse by:
      determining whether the root cause of the seasonal SLA violations is associated with the internal network by analyzing traffic in the internal network, and
      determining whether the root cause of the seasonal SLA violations is associated with the particular service provider network by determining a measure of correlation between SLA failure time series for tunnels in other SD-WANs of the plurality of SD-WANs that also traverse the particular service provider network with one or more SLA failure time series for the one or more tunnels in the SD-WAN; and
    initiate a corrective measure based on the determined root cause of the seasonal SLA violations by the one or more tunnels.

11. The apparatus as in claim 10, wherein the apparatus determines whether the root cause of the seasonal SLA violations is associated with a particular service provider network by:
  identifying the tunnels in the other SD-WANs that also traverse the particular service provider network.

12. The apparatus as in claim 10, wherein the apparatus determines the root cause of the seasonal SLA violations is associated with the internal network connected to the one or more tunnels comprises:
  identifying seasonal spikes in traffic in the internal network associated with the one or more tunnels.

13. The apparatus as in claim 10, wherein the apparatus determines whether the root cause of the seasonal SLA violations is associated with the internal network connected to the one or more tunnels comprises:

using a machine learning-based classifier to identify one or more traffic features of traffic in the internal network as associated with the SLA violations.

14. The apparatus as in claim 10, wherein the apparatus initiates the corrective measure based on the determined root cause by:
redirecting traffic of the one or more tunnels to one or more alternate tunnels in the SD-WAN.

15. The apparatus as in claim 14, wherein the root cause of the seasonal SLA violations is identified as the particular service provider network, and wherein the one or more alternate tunnels traverse a different service provider network.

16. The apparatus as in claim 10, wherein the apparatus determines whether the root cause of the seasonal SLA violations is associated with the internal network connected to the one or more tunnels by:
performing deep packet inspection on traffic of the internal network sent via the one or more tunnels, to identify one or more applications associated with the traffic.

17. The apparatus as in claim 10, wherein the process when executed is further configured to:
provide an indication of the seasonal SLA violations and the root cause to a user interface.

18. The apparatus as in claim 10, wherein the regression model uses time-of-day and day-of-week as features.

19. A tangible, non-transitory, computer-readable medium storing program instructions that cause a supervisory service for a plurality of software-defined wide area networks (SD-WANs) to execute a process comprising:
detecting, by the supervisory service, seasonal service level agreement (SLA) violations by one or more tunnels in a SD-WAN of the plurality of SD-WANs using a machine learning-based regression model, wherein the SD-WAN allows virtualization of WAN functions over the one or more tunnels for one or more service provider networks;
identifying, by the supervisory service, a root cause of the seasonal SLA violations as associated either 1) with an internal network connected to the one or more tunnels or 2) with a particular service provider network over which the one or more tunnels traverse by:
determining whether the root cause of the seasonal SLA violations is associated with the internal network by analyzing traffic in the internal network, and
determining whether the root cause of the seasonal SLA violations is associated with the particular service provider network by determining a measure of correlation between SLA failure time series for tunnels in other SD-WANs of the plurality of SD-WANs that also traverse the particular service provider network with one or more SLA failure time series for the one or more tunnels in the SD-WAN; and
initiating, by the supervisory service, a corrective measure based on the determined root cause of the seasonal SLA violations by the one or more tunnels.

20. The computer-readable medium as in claim 19, wherein initiating the corrective measure based on the determined root cause comprises:
redirecting traffic of the one or more tunnels to one or more alternate tunnels in the SD-WAN.

* * * * *

UNITED STATES PATENT AND TRADEMARK OFFICE
CERTIFICATE OF CORRECTION

PATENT NO. : 10,880,186 B2
APPLICATION NO. : 16/371556
DATED : December 29, 2020
INVENTOR(S) : Vikram Kumaran et al.

Page 1 of 1

It is certified that error appears in the above-identified patent and that said Letters Patent is hereby corrected as shown below:

In the Specification

Column 3, Line 35, please amend as shown:
2a.) Site Type B1: a site connected to the network using Column 8, Line 14, please amend as shown:
time window for analysis (e.g., 8 weeks).

Signed and Sealed this
Second Day of March, 2021

Drew Hirshfeld
*Performing the Functions and Duties of the
Under Secretary of Commerce for Intellectual Property and
Director of the United States Patent and Trademark Office*